(12) United States Patent
Gruber et al.

(10) Patent No.: US 7,228,684 B2
(45) Date of Patent: Jun. 12, 2007

(54) INTERNAL COMBUSTION ENGINE

(75) Inventors: Friedrich Gruber, Hippach (AT);
Stephan Laiminger, Kirchbichl (AT);
Thomas Bergmann, Jenbach (AT)

(73) Assignee: GE Jenbacher GmbH & Co OHG, Jenbach (AT)

( * ) Notice: Subject to any disclaimer, the term of this patent is extended or adjusted under 35 U.S.C. 154(b) by 117 days.

(21) Appl. No.: 10/949,446

(22) Filed: Sep. 23, 2004

(65) Prior Publication Data

US 2005/0126168 A1  Jun. 16, 2005

(30) Foreign Application Priority Data

Sep. 23, 2003   (AT) ............... A 1502/2003

(51) Int. Cl.
*F01N 3/02* (2006.01)
*F01N 5/02* (2006.01)
*F01N 7/00* (2006.01)
*F01N 7/10* (2006.01)
*F01N 7/06* (2006.01)
*F02B 37/02* (2006.01)
*F02D 23/00* (2006.01)

(52) U.S. Cl. .................... 60/321; 60/320; 60/322; 60/323; 60/602

(58) Field of Classification Search .......... 60/605.3, 60/320–323, 602
See application file for complete search history.

(56) References Cited

U.S. PATENT DOCUMENTS

| | | | | |
|---|---|---|---|---|
| 2,551,307 A | * | 5/1951 | Yingling ............... | 60/321 |
| 3,357,413 A | * | 12/1967 | Douglas ............... | 60/321 |
| 4,187,678 A | * | 2/1980 | Herenius ............... | 60/321 |
| 4,194,484 A | * | 3/1980 | Kirchweger et al. .... | 60/321 |
| 4,214,443 A | * | 7/1980 | Herenius ............... | 60/321 |
| 4,848,083 A | * | 7/1989 | Goerlich ............... | 60/303 |
| 4,924,672 A | * | 5/1990 | Sekiya et al. .......... | 60/310 |
| 5,022,227 A | * | 6/1991 | Sudmanns ............. | 60/321 |
| 5,305,603 A | * | 4/1994 | Baumann .............. | 60/321 |
| 5,337,559 A | * | 8/1994 | Deutschmann ......... | 60/321 |
| 5,463,867 A | * | 11/1995 | Ruetz .................. | 60/321 |
| 5,600,950 A | * | 2/1997 | Ottenschlaeger ....... | 60/321 |
| 6,176,082 B1 | * | 1/2001 | Shaffer ................. | 60/321 |
| 6,360,532 B2 | * | 3/2002 | Strahle et al. ......... | 60/321 |
| 6,397,589 B1 | * | 6/2002 | Beson et al. .......... | 60/320 |
| 6,978,772 B1 | * | 12/2005 | Dorn et al. ........... | 60/321 |
| 2004/0050374 A1 | * | 3/2004 | Aupperle et al. ...... | 123/568.12 |

FOREIGN PATENT DOCUMENTS

| | | | | |
|---|---|---|---|---|
| DE | 810 554 C | 8/1951 | | |
| DE | 27 21 614 A1 | 11/1978 | | |
| DE | 42 06 249 C1 | 6/1993 | | |
| DE | 42 07 048 C1 | 6/1993 | | |
| JP | 59000523 A | * 1/1984 | ............... | 60/321 |
| JP | 63227916 A | * 9/1988 | ............... | 60/321 |
| SU | 850880 B | * 7/1981 | | |

* cited by examiner

Primary Examiner—Thai-Ba Trieu
(74) Attorney, Agent, or Firm—Wenderoth, Lind & Ponack, L.L.P.

(57) ABSTRACT

An internal combustion engine includes a plurality of cylinders (1 through 12) and at least one turbocharger (2) and at least one exhaust manifold (13) which passes exhaust gases from two or more cylinders (5, 6) to the turbocharger (20), wherein the exhaust manifold (13) has a region (15) cooled with a cooling device and a substantially uncooled region (14).

18 Claims, 1 Drawing Sheet

INTERNAL COMBUSTION ENGINE

BACKGROUND

The present invention concerns an internal combustion engine comprising a plurality of cylinders and at least one turbocharger and at least one exhaust manifold which passes exhaust gases from two or more cylinders to the turbocharger.

Arrangements of that kind are known in accordance with the state of the art. The term exhaust manifold is used generally to denote the conduit communication between the cylinder head outlet and the turbocharger intake in the case of multi-cylinder engines. Those exhaust manifolds are usually either in the form of an uncooled and heat-insulated conduit assembly or they are of a water-cooled structure. In the case of a water-cooled arrangement the exhaust gas-carrying pipes are surrounded by a cooling water jacket, as is shown for example in DE 810 554 C, DE 42 07 048 C1 and DE 42 06 249 C1. Exhaust conduits of that kind are used inter alia in marine and explosion-protection sectors where high surface temperatures have to be avoided. In situations involving stoichiometric engine operation, water-cooled exhaust conduits are also used by virtue of the extremely high gas temperatures as otherwise the severe development of heat results in overloading of the materials carrying the exhaust gases. Alternatively in the case of a marine engine with a plurality of exhaust conduits it is also known from DE 27 21 614 A1 to provide a water-cooled intermediate plate between the exhaust gas conduits and the turbocharger for thermal decoupling purposes.

When the entire exhaust gas manifold involves a great cooling effect in terms of area the engine cooling water is greatly heated whereby thermal damage can be caused to the engine. With cooling involving a small area the exhaust gas is not sufficiently cooled down so that critical turbine intake temperatures can result in overheating of the turbocharger.

SUMMARY

Therefore the object of the present invention is to provide cooling for an exhaust manifold with which, in spite of adequate cooling, a minimum of heat to be dissipated is made possible.

In accordance with the invention that is achieved in that the exhaust manifold has a region cooled with a cooling device and a substantially uncooled region.

The solution according to the invention for cooling the exhaust manifold permits a combination of the advantages of an uncooled construction (for example by maximising exhaust gas enthalpy for use in the exhaust gas turbine and minimising the cooling water heat to be dissipated) with the advantage of a water-cooled construction (in regard to reduction of the exhaust gas temperature to a level which can be well handled from the material technology point of view).

A preferred embodiment of the invention provides that the cooled region is arranged at the end of the exhaust manifold, as viewed in the flow direction, upstream of the turbocharger, wherein the most advantageous results are achieved if the cooled region is arranged directly upstream of the turbocharger. In that way the cooled region which is preferably in the form of a stiff component can also be used as a connecting portion and holding means for the exhaust gas turbine. In addition, the cooling water can be regulated to an exact and non-critical turbine intake temperature by a temperature measuring device and a regulating device coupled thereto.

It is preferably provided that the cooled region includes an exhaust gas control device. That device serves for specifically diverting the exhaust gases from the exhaust gas turbocharger and it is thus possible to avoid a so-called compressor pumping effect. It is advantageous if the exhaust gas control device is arranged in a structural unit with the cooled region. By virtue of a suitable configuration of the cooling jacket the internal functional elements of the exhaust gas control device (for example valve body, valve seat, valve guide etc) are cooled or protected from thermal overloading. It is further advantageously provided that the cooled region includes a cooled valve actuating device. The exhaust gas control device is protected from thermal overloading by a cooled valve seat and a cooled contact surface for the valve actuating device. By virtue of the fact that a connecting conduit is arranged between the exhaust gas control device and the exhaust pipe, a valve (for example a waste gate) can divert excess exhaust gases upstream of the exhaust gas turbine by way of a connecting conduit into the exhaust pipe. It is advantageously provided that both the connecting conduit and also the valve actuating device are arranged in a structural unit with the cooled region in order to protect those components from thermal overloading.

A preferred embodiment of the invention provides that the cooled region of the exhaust manifold can be fixed to at least one cylinder head. The exhaust gas connections of the cylinder heads, the exhaust valves of which open into the cooled region, serve as rigid holding struts and thereby impart to the cooled region of the exhaust gas conduit a high level of stability and a more greatly damped vibration characteristic, which in turn prolongs the service life of the components used in terms of material fatigue. It is particularly advantageously provided that the turbocharger can be fixed to the cooled region, as it serves as a connecting portion and holding means for the exhaust gas turbine with a configuration in respect of the exhaust gas duct, which is appropriately flow-optimised.

It is desirably provided that the cooling device is a water cooling system, wherein a part of the exhaust manifold is enclosed by a water jacket. The cooling water can be taken either from the engine cooling water circuit or an external cooling circuit. In particular the cooling device of the cooled region can be combined with a water-cooled turbine housing which is possibly used, and/or with a water-cooled valve guide body. The water jacket of the cooled region preferably almost completely encloses the exhaust manifold contained therein.

It is particularly advantageously provided that the cooled region of the exhaust manifold extends over at least one and preferably between two and three cylinders. That permits a combination of an uncooled exhaust manifold with a cooled exhaust manifold, wherein the proportion of the cooled region is only so great as is required to achieve a desired exhaust gas temperature. In general it is particularly desirable if the ratio in respect of length of the cooled region to the uncooled region of the exhaust manifold is between 15% and 80%, preferably between 20% and 40%.

A preferred aspect of the invention provides that a pressure equalisation conduit is arranged between the two exhaust manifolds of the two banks of cylinders. In that way the dimensioning of the exhaust gas control member can preferably be such that only one exhaust gas control device is required per engine.

BRIEF DESCRIPTION OF THE DRAWING

Further details and advantages of the present invention are described in greater detail hereinafter by means of the specific description with reference to the drawing in which.

DETAILED DESCRIPTION OF PREFERRED EMBODIMENTS

Figure 1:
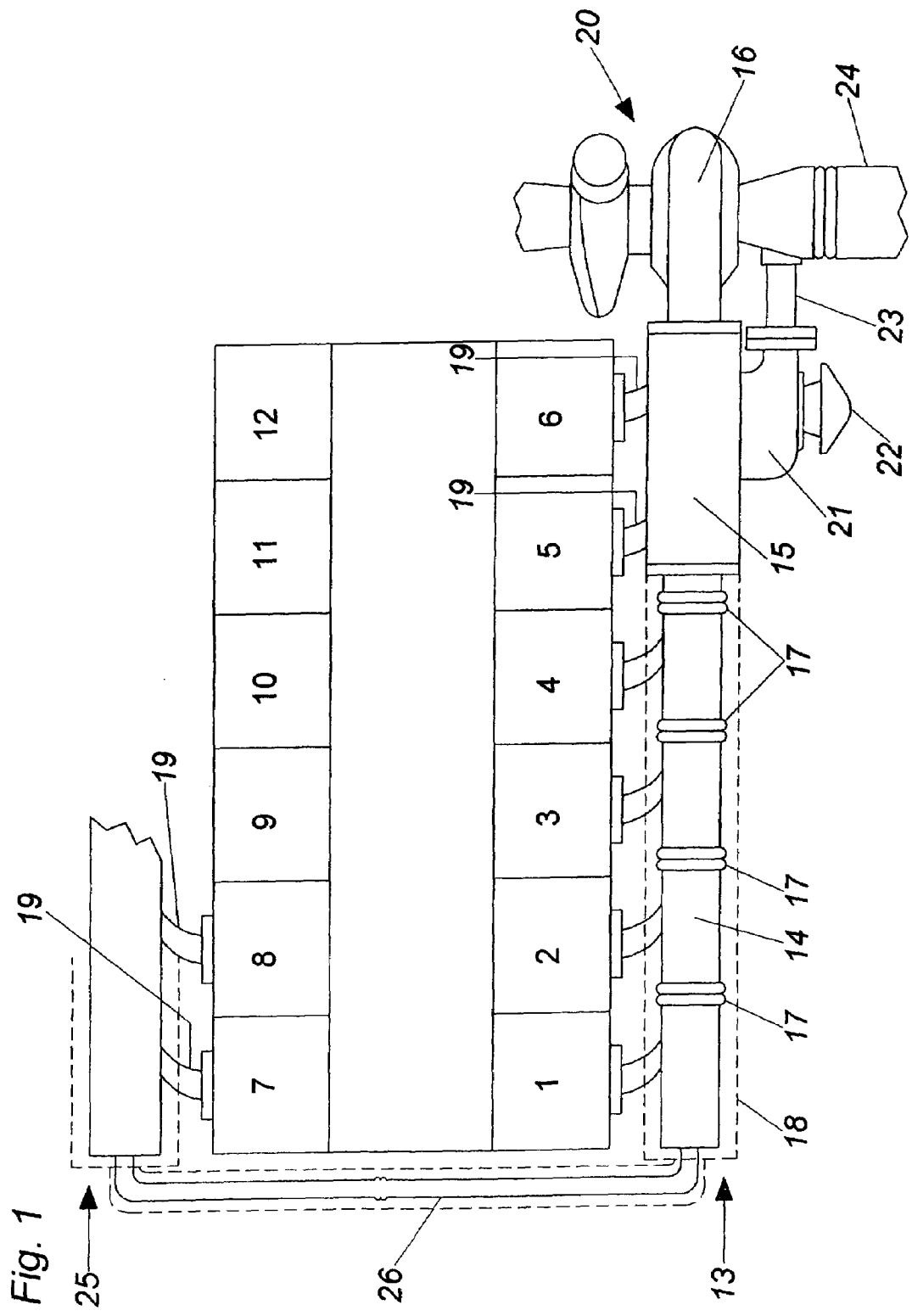
FIG. 1 is a diagrammatic view of an internal combustion engine with the exhaust manifold according to the invention.

FIG. 1 shows a diagrammatic arrangement of an internal combustion engine which, by way of example, includes 12 cylinders (1 through 12) with an exhaust gas turbine 16 of a turbocharger 20. The exhaust manifold 13 according to the invention has an uncooled region 14 and a region 15 cooled with a cooling device. The cooled region 15 is arranged in the flow direction downstream of the uncooled region 14 of the exhaust manifold 13, the two regions being flange-connected together. The uncooled region 14 of the exhaust manifold 13 has devices for damping axial and radial stresses, preferably compensators 17, and is enclosed with insulating material 18. Thermal expansion of the uncooled region 14 is accommodated by a compensator 17 in the proximity of the flange. In the illustrated embodiment, the cooled region 15 is secured to two exhaust gas connecting portions 19 of the cylinders 5, 6, these serving as rigid holding struts. The cooled region 15 is arranged directly upstream of the turbocharger 20 and has an exhaust gas control device 21 with a valve actuating device 22 which for example with a waste gate dumps the exhaust gas out of the exhaust manifold 13 into the exhaust pipe 24 when required by way of a connecting conduit 23. The exhaust gas control device 21 is integrated into the cooled region 15 in such a fashion that the flow passage for the dumped exhaust gas and the control or regulating valve or the control or regulating flap are disposed in a water-cooled region 15 is preferably so arranged that the exhaust gas turbine 16 can be flange-mounted directly to the cooled region 15. In regard to the passage configuration and the nature of the external dimensions, the cooled region 15 is preferably so arranged that the exhaust gas turbine 16 can be flange-mounted directly to the cooled region 15. In a preferred embodiment, as also shown in FIG. 1, the engine, as in the case of V-engine, has two banks of cylinders (cylinders 1 through 6 and cylinders 7 through 12, respectively) each having a respective exhaust manifold 13, 25, wherein a pressure equalisation conduit 26 is arranged between the two exhaust manifolds 13, 25 of the two banks of cylinders.

It will be appreciated that the present invention is not restricted to the embodiments illustrated in FIG. 1, nor is it to be limited thereby. The size of the cooled region depends on the desired exhaust gas temperature and can therefore vary in size. It will be appreciated that, besides water cooling, it is also possible to consider suitable air cooling and/or a combination of the two.

The invention claimed is:

1. An internal combustion engine comprising a plurality of cylinders and at least one turbocharger and at least one exhaust manifold which passes exhaust gases from two or more of said plurality of cylinders to the turbocharger, wherein the exhaust manifold includes a cooled exhaust manifold region cooled with a cooling device and an uncooled exhaust manifold region which is not cooled by the cooling device, and wherein the cooled exhaust manifold region is arranged at an end of the exhaust manifold, as viewed in a flow direction, upstream of the turbocharger such that at least a portion of the exhaust gases cooled in the cooled exhaust manifold region are directed to an exhaust gas turbine of the turbocharger.

2. An internal combustion engine as set forth in claim 1 wherein the cooled exhaust manifold region is arranged directly upstream of the turbocharger.

3. An internal combustion engine as set forth in claim 1 wherein the cooled exhaust manifold region includes an exhaust gas control device.

4. An internal combustion engine as set forth in claim 3 wherein the exhaust gas control device is arranged in a structural unit with the cooled exhaust manifold region.

5. An internal combustion engine as set forth in claim 3, further comprising an exhaust pipe connected downstream of the turbocharger, and wherein a connecting conduit is arranged between the exhaust gas control device and the exhaust pipe.

6. An internal combustion engine as set forth in claim 5 wherein the connecting conduit is arranged in a structural unit with the cooled exhaust manifold region.

7. An internal combustion engine as set forth in claim 1 wherein the cooled exhaust manifold region includes a cooled valve actuating device.

8. An internal combustion engine as set forth in claim 7 wherein the valve actuating device is arranged in a structural unit with the cooled exhaust manifold region.

9. An internal combustion engine as set forth in claim 1 wherein the cooled exhaust manifold region of the exhaust manifold is fixed to at least one cylinder head.

10. An internal combustion engine as set forth in claim 1 wherein the turbocharger is fixed to the cooled exhaust manifold region.

11. An internal combustion engine as set forth in claim 1 wherein the uncooled exhaust manifold region of the exhaust manifold has devices for damping axial and radial stresses.

12. An internal combustion engine as set forth in claim 11 wherein the devices for damping axial and radial stresses are compensators.

13. An internal combustion engine as set forth in claim 1 wherein the uncooled exhaust manifold region is enclosed with insulating material.

14. An internal combustion engine as set forth in claim 1 wherein the cooling device is a water cooling system, and wherein a part of the exhaust manifold is enclosed by a water jacket.

15. An internal combustion as set forth in claim 1, wherein the plurality of cylinders comprises at least three cylinders, and wherein the cooled exhaust manifold region of the exhaust manifold extends over at least one cylinder.

16. An internal combustion engine as set forth in claim 1 wherein a ratio of a length of the cooled exhaust manifold region to a length of the uncooled exhaust manifold region of the exhaust manifold is between 15% and 80%.

17. An internal combustion engine as set forth in claim 16 wherein the ratio of the length of the cooled exhaust manifold region to the length of the uncooled exhaust manifold region of the exhaust manifold is between 20% and 40%.

18. An internal combustion engine according to claim 1 further comprising a V-engine with two banks of cylinders each having a respective exhaust manifold wherein a pressure equalization conduit is arranged between the two exhaust manifolds of the two banks of cylinders.

* * * * *